United States Patent [19]

Colineau et al.

[11] Patent Number: 4,816,908
[45] Date of Patent: Mar. 28, 1989

[54] COLOR VIDEO PROJECTOR WITH A CONVERGENCE ADJUSTMENT DEVICE WHICH IMPOSES AN AUTOMATIC SEQUENCE OF MULTI-ZONE CONVERGENCE ADJUSTMENT STEPS

[75] Inventors: Joseph Colineau, Seiches Sur Le Loir; Hossein Ahmari, Angers, both of France

[73] Assignee: Societe Electronique de la Region Pays de Loire, Paris, France

[21] Appl. No.: 840,275

[22] Filed: Mar. 17, 1986

[30] Foreign Application Priority Data

Mar. 15, 1985 [FR] France ............................ 85 03901

[51] Int. Cl.$^4$ .......................... H04N 9/31; H04N 9/28
[52] U.S. Cl. ........................................ 358/60; 358/64; 315/368
[58] Field of Search ................... 358/56, 60, 64, 65; 315/368

[56] References Cited

U.S. PATENT DOCUMENTS

| | | | |
|---|---|---|---|
| 3,943,279 | 3/1976 | Austefjord | 358/60 |
| 4,309,723 | 1/1982 | Ryan et al. | 358/163 |
| 4,422,019 | 12/1983 | Meyer | 315/368 |
| 4,503,456 | 3/1985 | Nakamura et al. | 358/51 |
| 4,549,117 | 10/1985 | Takahashi et al. | 358/60 |
| 4,551,655 | 11/1985 | Timmermans et al. | 358/60 |
| 4,672,275 | 6/1987 | Ando | 358/64 |
| 4,673,847 | 6/1987 | Louie et al. | 315/368 |
| 4,706,115 | 11/1987 | Colineau et al. | 358/64 |

FOREIGN PATENT DOCUMENTS

| | | | |
|---|---|---|---|
| 0068420 | 1/1983 | European Pat. Off. | 358/64 |
| 58-101586 | 6/1983 | Japan | 315/368 |

Primary Examiner—James J. Groody
Assistant Examiner—Randall S. Svihla
Attorney, Agent, or Firm—Pollock, VandeSande & Priddy

[57] ABSTRACT

A convergence adjustment device for color video-projectors having three monochrome tubes, each projecting an image of a give color on a screen. This device acts on the scanning of the second and third tubes for superimposing, on the screen, their images on that of the first tube. This device is of the digital type. It comprises a RAM in which correction values are stored corresponding to correction of the scanning currents for the different zones into which the image is divided. These values are restored in synchronism with the scanning of the zones during normal operation. The device also comprises a microprocessor for modifying, during the adjustment phase, the stored values as a function of the ordes issued by the user who makes this adjustment by observing the image. The user's actions in a manual mode affect only a single one of the zones. In an automatic mode, adjustments are effective on groups of zones.

32 Claims, 13 Drawing Sheets

FIG_1
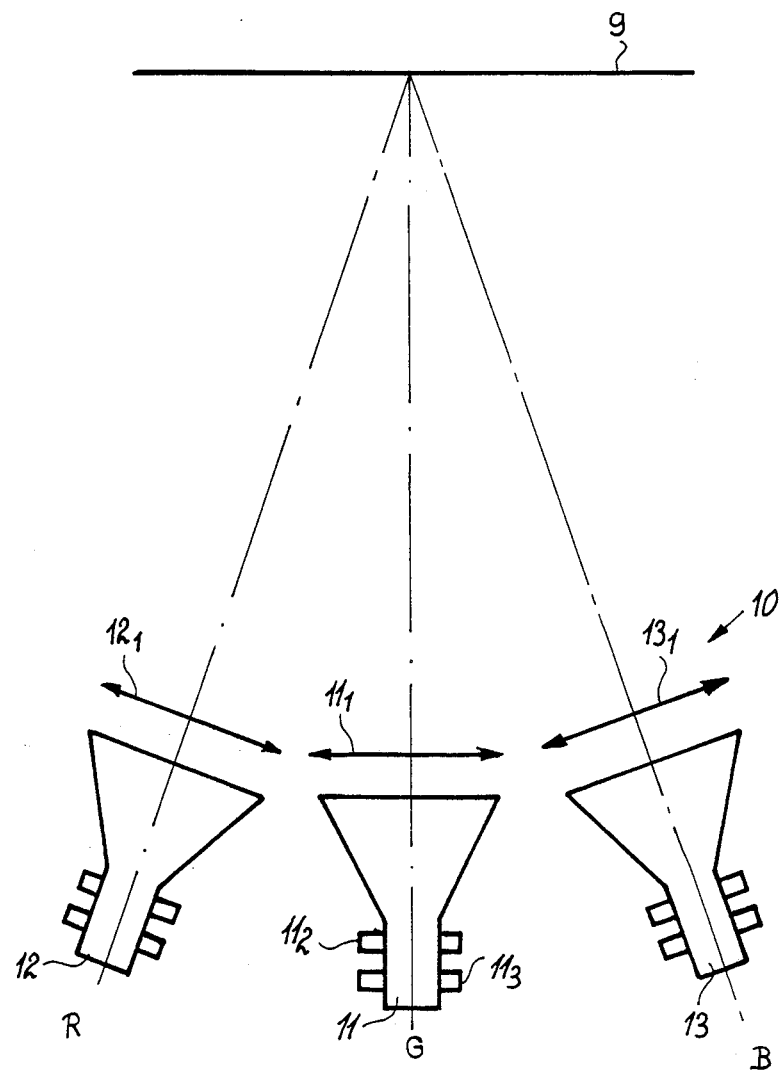
PRIOR ART

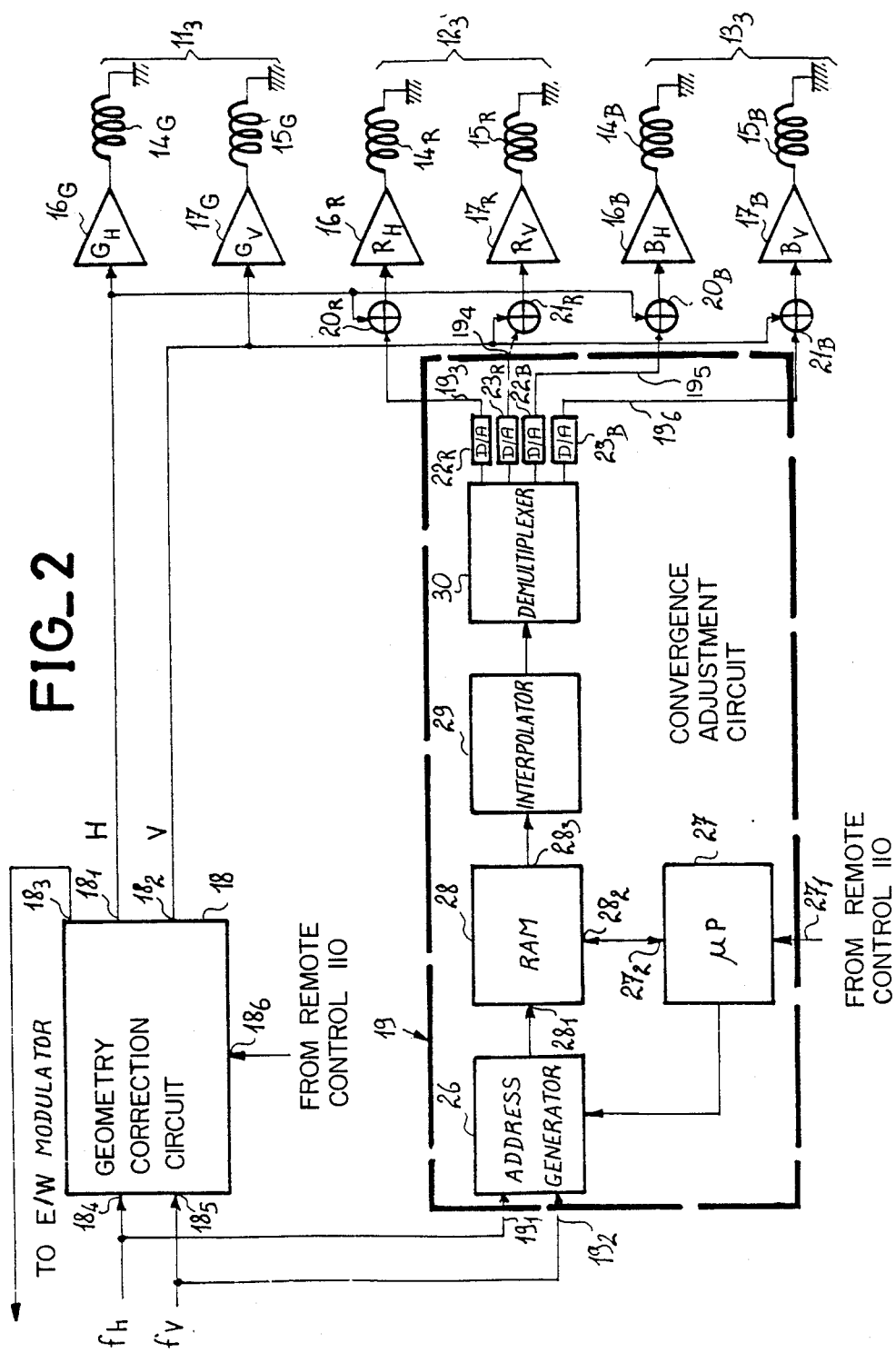

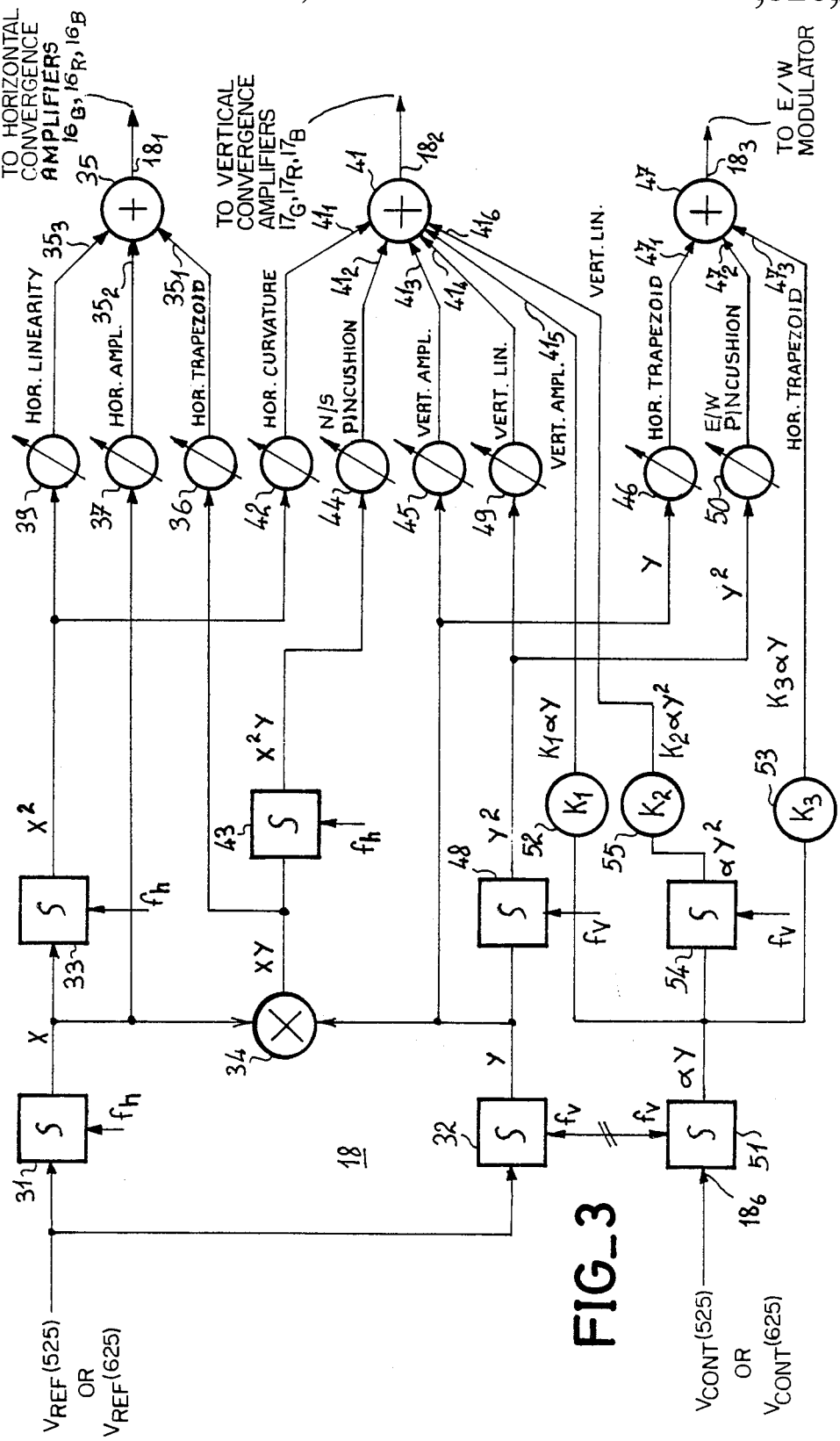
FIG_3

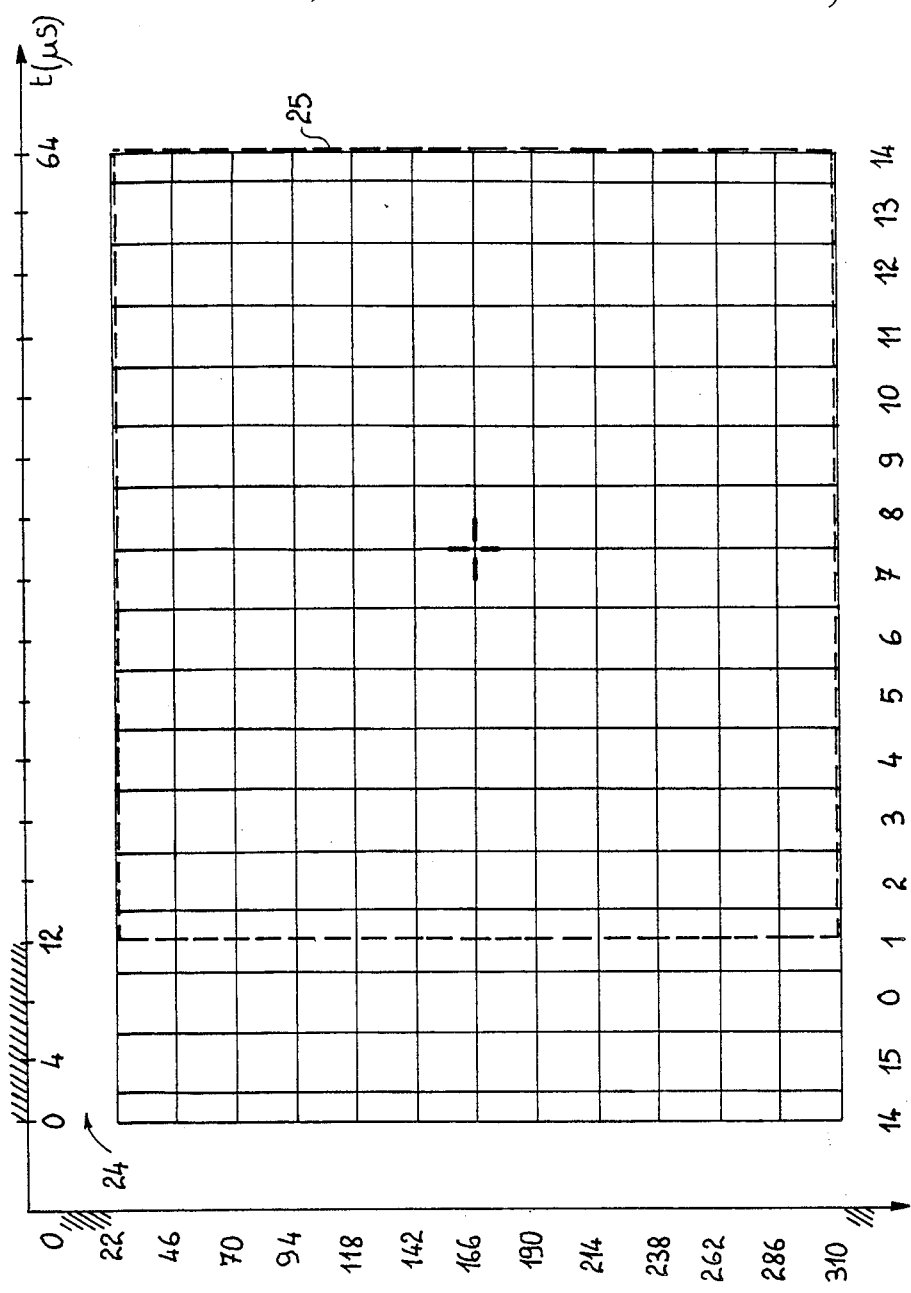
FIG_4

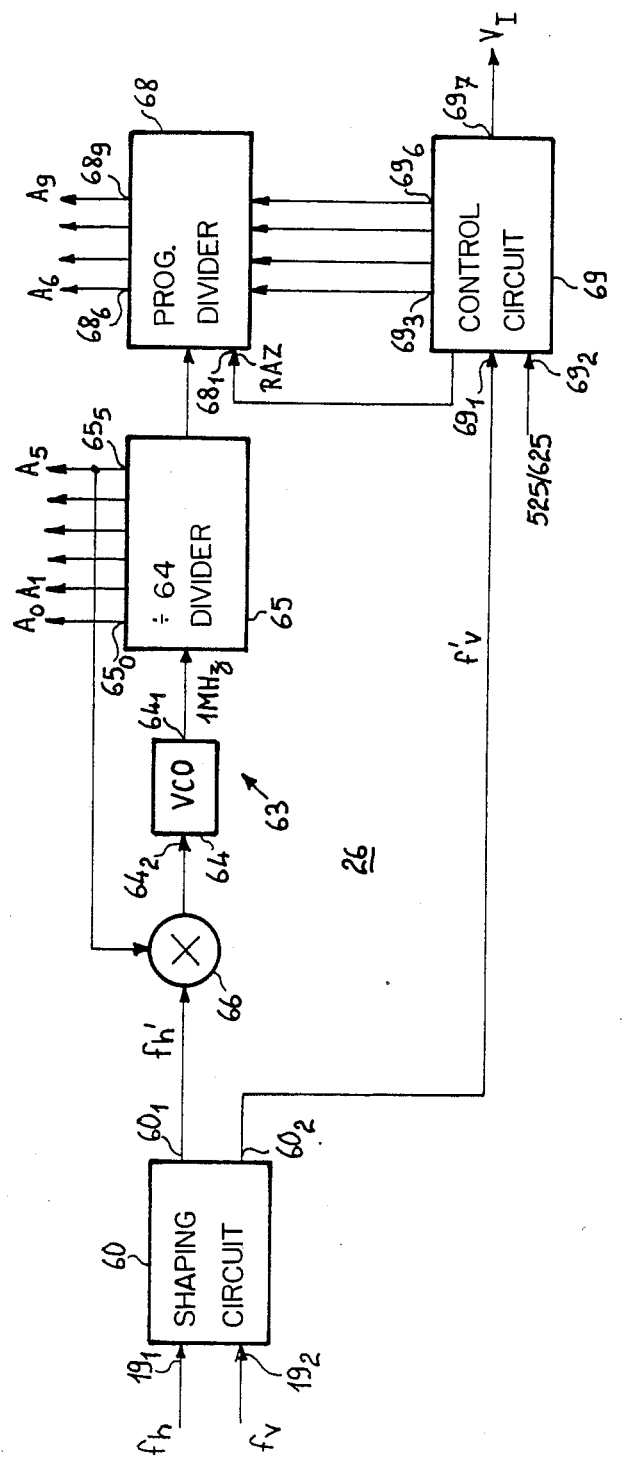
FIG_5

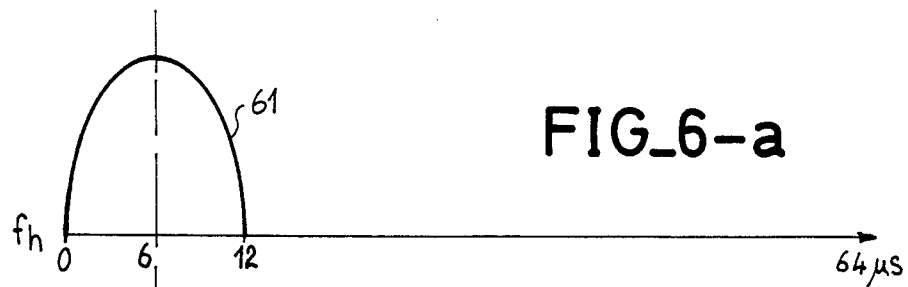
FIG_6-a
FIG_6-b
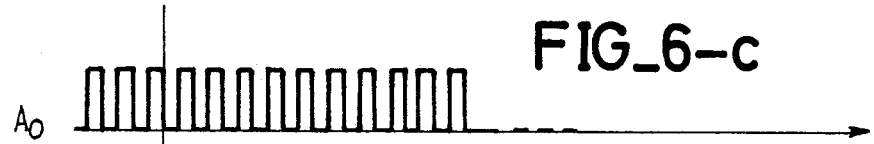
FIG_6-c
FIG_6-d
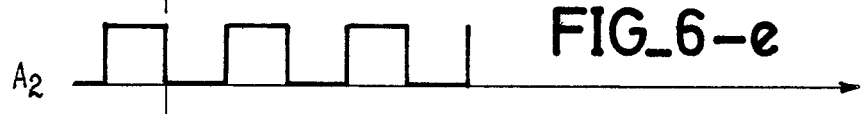
FIG_6-e
FIG_6-f

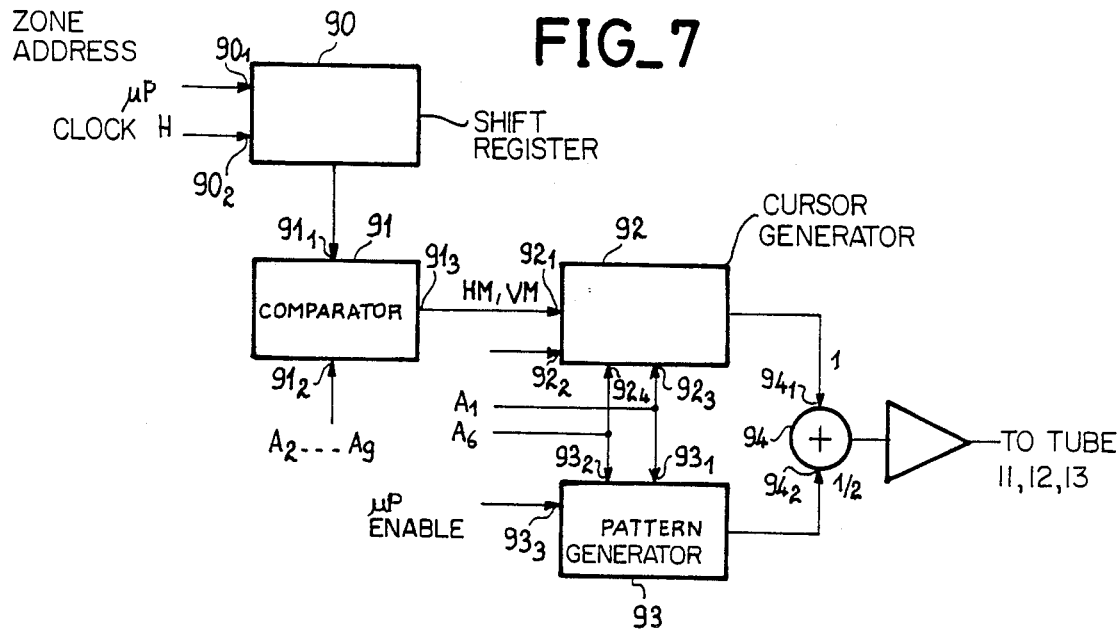
FIG_7
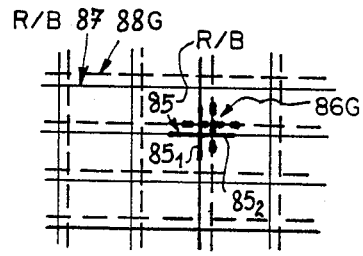
FIG_8

FIG_9-a
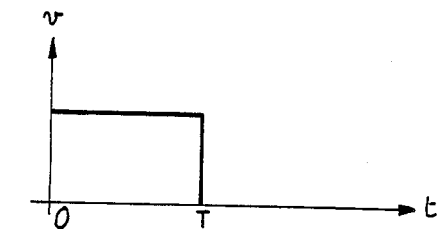
FIG_9-b
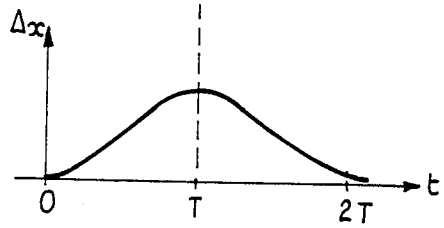
FIG_11-a
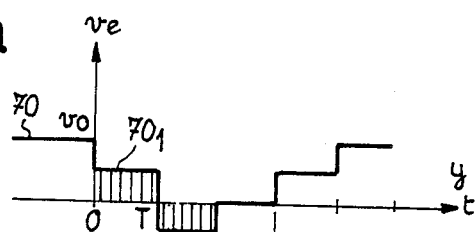
FIG_11-b
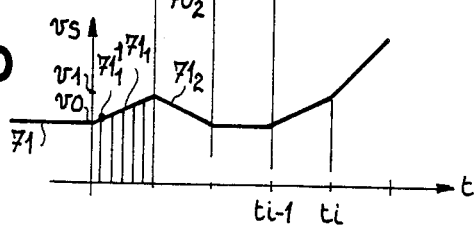

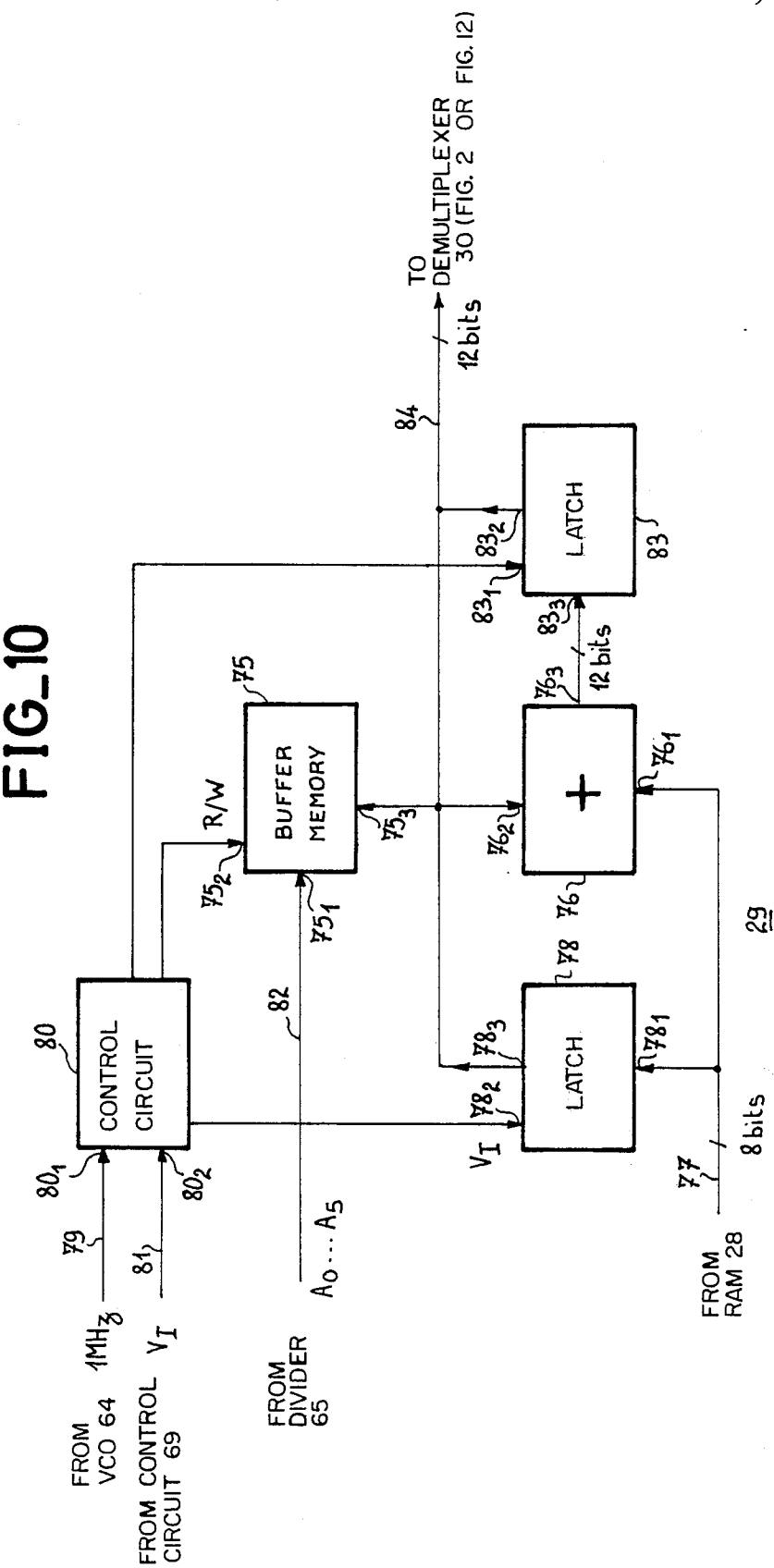

FIG_11-c
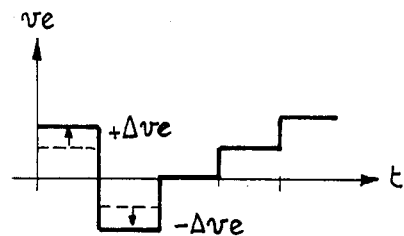
FIG_11-d
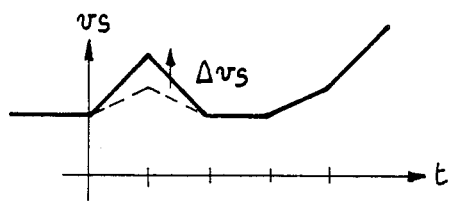
FIG_11-e
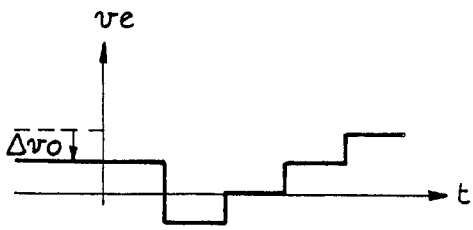
FIG_11-f
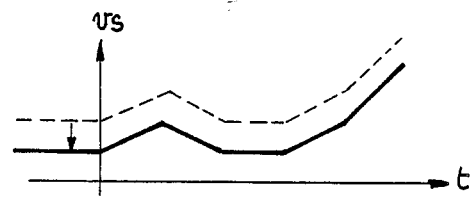

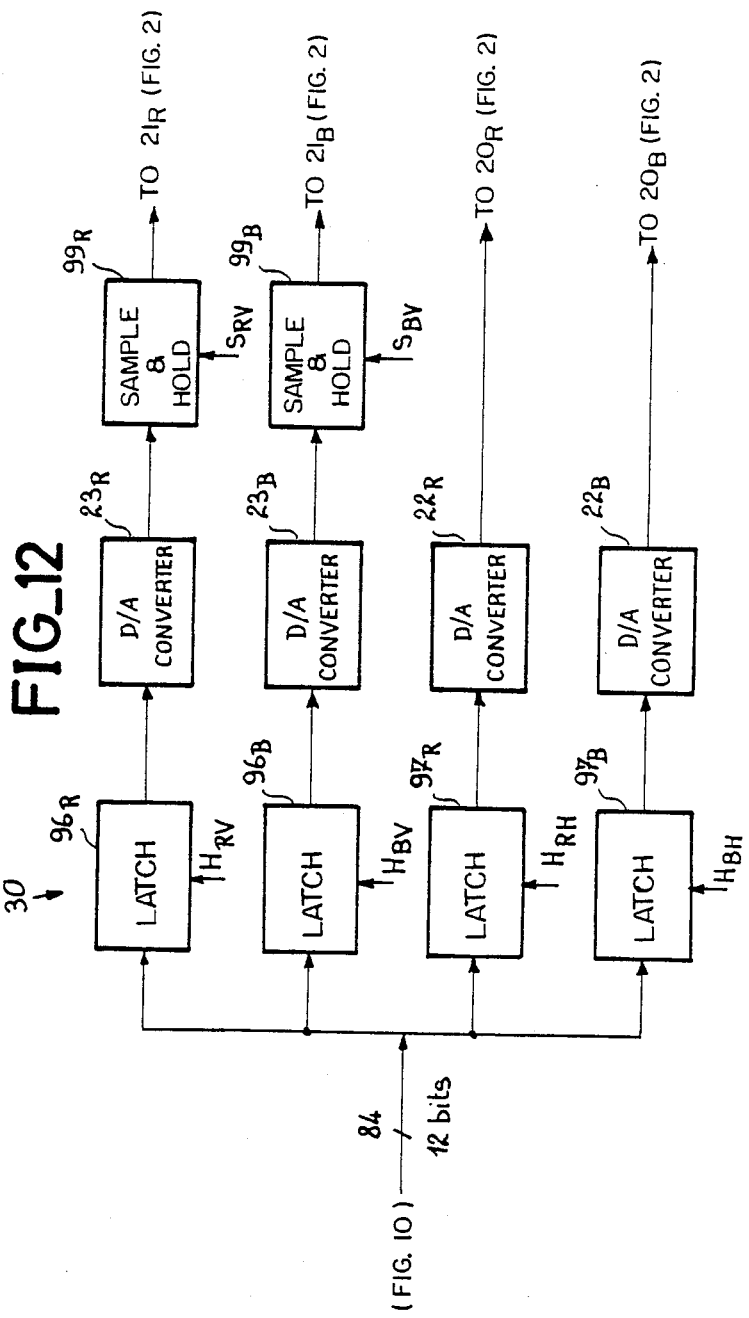

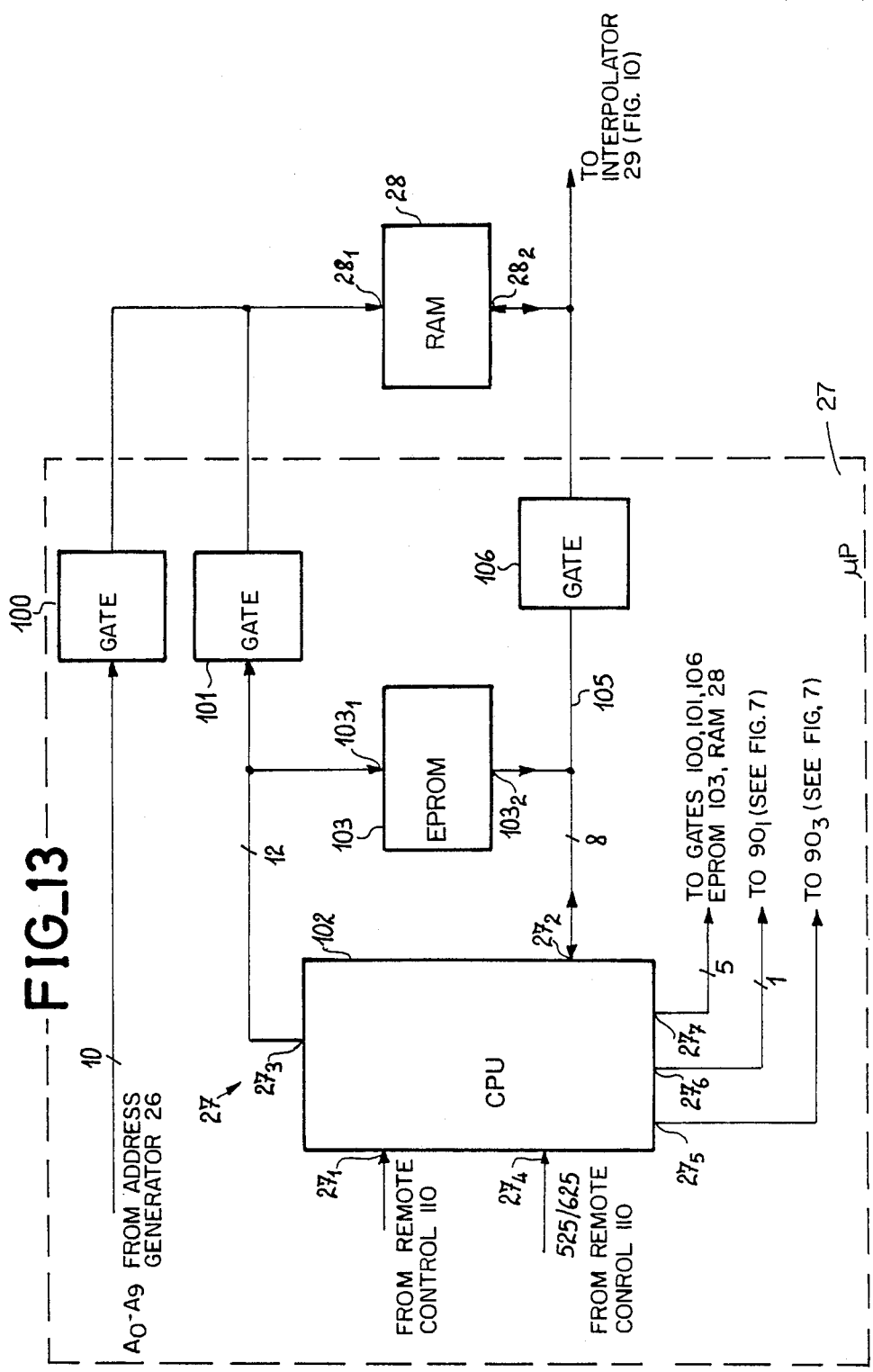

FIG_14
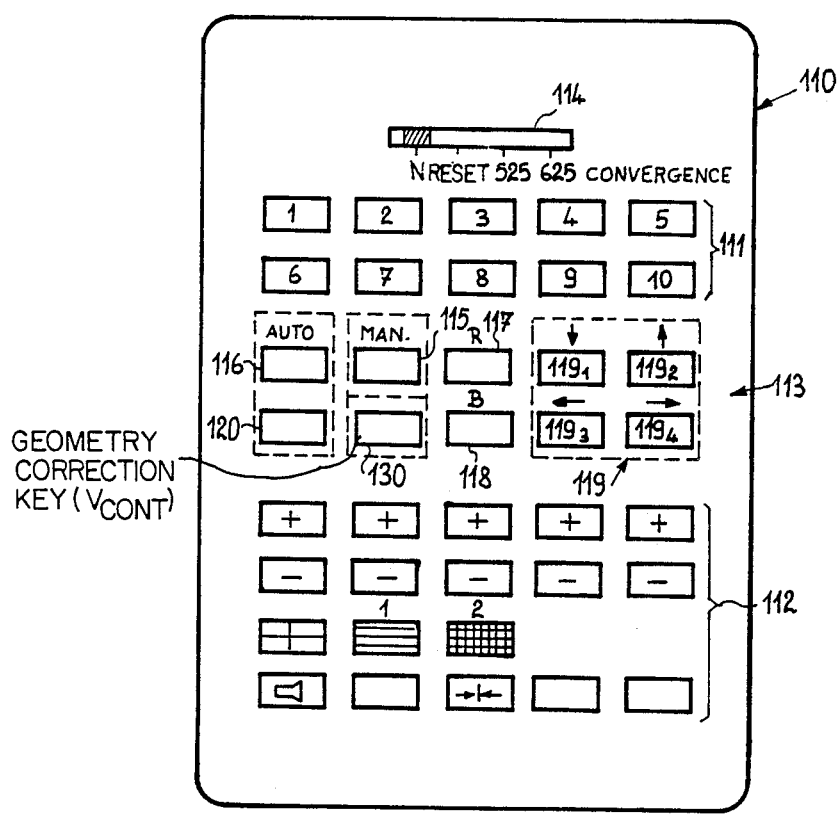
GEOMETRY CORRECTION KEY ($V_{CONT}$)
FIG_15
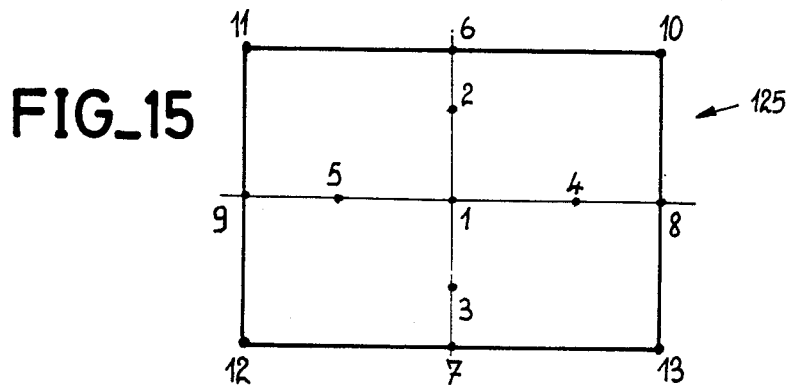

COLOR VIDEO PROJECTOR WITH A CONVERGENCE ADJUSTMENT DEVICE WHICH IMPOSES AN AUTOMATIC SEQUENCE OF MULTI-ZONE CONVERGENCE ADJUSTMENT STEPS

CROSS-REFERENCE TO RELATED APPLICATION

Reference is made to applicants' copending application Ser. No. 840,163, filed Mar. 17, 1986, now U.S. Pat. No. 4,706,115.

BACKGROUND OF THE INVENTION

The invention relates to a convergence adjustment device for video-projectors comprising several cathode ray tubes.

A video-projector is a television receiver projecting images on a larger sized screen than the usual screens of cathode ray tubes. The most widely used type comprises three cathode ray tubes, one for each fundamental color and, for each of these tubes, a lens for projecting onto the screen. The images produced by the three tubes must be perfectly superimposed on the screen. This result is practically impossible to attain by simple adjustments of the orientation of the projection tubes and lenses. The reasons for this impossibility are diverse: the dispersion, inherent in large scale manufacture, of the forms of the images produced by each of the tubes; the lenses, usually made from a plastic material which, for reasons of economy, are not provided with chromatic corrections and which therefore do not have the same index of refraction for the three fundamental colors; not all of the axes of the three tubes may be perpendicular to the projection screen; in general, the axis of the tube projecting the green image is theoretically perpendicular to the screen and the axes of the tubes projecting the red and blue images are slanted in opposite directions with respect to this perpendicular; thus, the green image may be rectangular whereas the red and blue images have the form of a trapezoid with vertical parallel edges.

This is why a video-projector comprises a convergence correction or adjustment device which generates currents feeding coils acting on the horizontal and vertical deflections of the electron beam of two of the tubes, in general the red and the blue, so as to shape the corresponding images so that they are superimposed on the screen on the image projected by the first tube, namely the green. This correction is effected either directly on the line deflection (horizontal) and frame deflection (frame) coils using active elements and modulators or by means of auxiliary deflectors.

Up to now, in order to provide such convergence adjustment during installation of the video-projector, analog circuits are used having potentiometers which are adjusted so that convergence correction signals are formed which are possibly variable from one zone to another of the image.

The circuit of the invention is of the digital type, and so inexpensive while nevertheless providing a great number of adjustments carried out by persons having no particular competence.

SUMMARY OF THE INVENTION

The convergence adjustment circuit for video-projectors having three tubes comprises, in accordance with the invention, a random access memory or RAM containing for each of N zones into which the image is divided, the values representing the corrections to be applied to the scanning currents, a processing means such as a microprocessor for modifying, during the adjustment phase, the contents of the memory as a function of the orders issued by the user. The user effects an adjustment per zone or per group of zones, by observation of the image, for example the superimposition of two sliders or cursors (simple figures) of different colors. The correction values stored in the memory then come into play automatically during normal use of the video-projector and means for imposing an automatic adjustment sequence with a number of steps less than the number of zones into which the image is divided. During the first step, the adjustment is made by observing the cursors in the center of the image and the microprocessor controls the modification of the correction values in the memory so as to move the whole of the red image and blue image, that is to say that all the zones are concerned by this first adjustment step. During subsequent steps, the number of zones affected by the adjustments progressively decreases.

This automatic adjustment sequence has the advantage of being able to be carried out more rapidly than zone by zone adjustment. In addition, it may be further shortened since the first adjustment steps affect the whole of the image, that is to say that as early as the first step a first overall adjustment of the image has been effected, which would not be the case if the adjustment were made zone by zone.

To carry out the adjustment, the user has available, in one embodiment, a remote control box, for example of the usual infrared type, with keys each of which allows him to issue orders for corrections to be stored in memory and which result, on the screen, in the movement of a cursor of a given color in a given direction (horizontal of vertical). Thus, each zone of the RAM comprises four correction signals: the first for the horizontal red, the second for the vertical red, the third for the horizontal blue and the fourth for the vertical blue. When the adjustment is made zone by zone, the blue cursor must be moved, for each zone, so as to superimpose it on the green cursor and the same operation must be carried out for the red color, that is to say that the red cursor must be moved so as to superimpose it on the green cursor.

Furthermore, it is preferable for the adjustment to be made in steps by moving the cursor an increment for increasing (or reducing) each correction value in the zones of the memory corresponding to each step. In this case, in order to avoid the accumulation, at each step, of inaccuracies due to the digital nature of the signals, stored correction values are modified, at each step, in the following way: from the contents of the memory n increments are subtracted, n being the algebraic number of steps made previously to the last movement of the slider and to the result of this subtraction are added $(n+1)$ or $(n-1)$ times (depending on the direction of movement) the increment.

In a preferred embodiment, the video-projector is of the type usable with video standards having different numbers of lines and the microprocessor calculates the modifications to be made to the values of the correction signals as a result of a charge in a video without the need to make the adjustments again. Thus, a video-projector which has been adjusted by the user with the SECAM standard (625 lines) may be used automatically, without further adjustment, with a video tape recorder of the NTSC standard having 525 lines per frame.

For dividing the image into zones an address generator is used, for example, having an oscillator operating at a frequency which is an even multiple, for example 64, of the horizontal scanning frequency, the signal from this oscillator being synchronized with the line scan signal, and at least one divider with parallel outputs at which decreasing frequency signals appear; the state of some of these pulses is used for representing the horizontal coordinates of the zones and other pulses, at lower frequencies, are used for representing, depending on their state, the vertical coordinates of the zones. Preferably, the first two outputs of the divider, at the highest frequencies, control the sequence for reading out or adjusting the four correction signals in each zone of the memory.

For a multistandard video-projector, the divider has two parts, the first part for producing the pulses for reading the correction signals in each zone and the address pulses in the horizontal direction, and the second for producing the address pulses in the vertical direction, this second part, which is fed by the first, being programmable for modifying the number of lines in each zone depending on the standard, a zone comprising for example 24 lines for SECAM and 20 lines for NTSC.

A video-projector usually also comprises geometry correction circuits acting on the scanning of the three tubes (whereas for adjusting convergences, the action is carried out on the scanning of two tubes) for correcting the usual deformations of the television image such as the north-south pincushion, the east-west pincushion as well as deformations specific to the video-projector, which are due to the variable slant of the axes of the tubes with respect to a perpendicular to the screen. In fact, the most usual case is the vertical screen and tubes whose axes are not in a horizontal plane but in a plane slanting upwardly in the direction of the projection; the form of the projection surface is also a possible cause of geometric deformation of the image.

Such geometry defects are, like convergence defects, corrected by acting on the horizontal and vertical deflection fields by means of geometry correction circuits. Some geometry corrections are independent of the orientation of the tubes with respect to the screen or of the form of the screen; they are generally made by the manufacturer. Other corrections are made by the user (or installer); these are horizontal trapezoid, vertical linearity and vertical amplitude defects. The vertical amplitude defect is a divergence of the height of the image with respect to the normal; the vertical linearity defect consists in the non conservation of the distances in the vertical direction and the horizontal trapezoid defect is a deformation of the image which, instead of being rectangular, has the form of a trapezoid with parallel horizontal edges. The adjustment device of the invention further comprises, in addition to the convergence adjustment circuit, a geometry adjustment circuit to be used by the user, and is preferably included in the remote control box.

BRIEF DESCRIPTION OF THE DRAWINGS

Other features and advantages of the invention will be clear from the following description of certain embodiments with reference to the accompanying drawings in which:

FIG. 1 is a simplified diagram of a three tube video-projector;

FIG. 2 is a general diagram of a circuit in accordance with the invention;

FIG. 3 is a diagram of the geometry adjustment part;

FIG. 4 shows the division of the image into zones;

FIG. 5 is a diagram of the address generator of the circuit of the invention;

FIGS. 6a to 6f show a part of the signals delivered by the address generator;

FIG. 7 is a test pattern and cursor generator forming part of the circuit of the invention;

FIG. 8 shows a test pattern and a cursor;

FIGS. 9a and 9b are diagrams showing an operating characteristic of the circuit of FIG. 2;

FIG. 10 is a diagram of an interpolator forming part of the circuit of the invention;

FIGS. 11a to 11f are diagrams showing the operation of the interpolator of FIG. 10;

FIG. 12 shows another part of the circuit of FIG. 2;

FIG. 13 shows yet another part of the circuit of FIG. 2;

FIG. 14 is a diagram of the remote control box forming part of the device of the invention; and FIG. 15 illustrates an adjustment sequence.

DESCRIPTION OF THE PREFERRED EMBODIMENTS

In the example a video projector 10 comprises three monochrome tubes 11, 12 and 13 projecting color images respectively green G, red R and blue B on a screen 9 through lenses, respectively $11_1$, $12_1$ and $13_1$. Each tube comprises main deflectors for providing horizontal and vertical scanning of the electron beam produced by an electron gun in the tube and a pair of auxiliary deflectors also acting on the electron beam for making geometry and convergence corrections. In FIG. 1, for the green tube 11, the pair of main deflectors has the reference $11_2$ and the auxiliary pair has the reference $11_3$.

Each pair of deflectors is formed of two coils, one for the horizontal deflection 14 and the other for the vertical deflection 15. In FIG. 2, the reference numbers for these coils have an index corresponding to the color of the corresponding tube, G for green, R for red and B for blue. Each coil is fed with an electric current by a convergence amplifier, referenced 16 for the horizontal deflection and 17 for the vertical deflection. Each amplifier 16,17 delivers at its output a current of intensity proportional to the voltage at its input. Deflection of the spot on the screen with respect to its nominal position is proportional to the intensity of the current passing through the deflector coil.

FIG. 2 shows the geometry correction circuit 18 and also the convergence adjustment circuit 19. The geometry correction circuit 18 has two outputs $18_1$ and $18_2$ feeding the inputs of all the horizontal and vertical convergence amplifiers, and a third output $18_3$ controlling an east-west modulator (not shown) associated with a main deflector. As will be seen hereafter with reference to FIG. 3, this circuit 18 has two inputs $18_4$ and $18_5$ receiving signals at the scanning frequencies respectively horizontal (or line) $f_h$ vertical (or frame) $f_v$.

The geometry correction circuit 18 feeds the three pairs of convergence amplifiers 16 and 17. On the other hand, the convergence correction circuit 19 only feeds two pairs of convergence amplifiers, those which are associated with the red tube 12 (R) and with the blue tube 13 (B). Circuits 18 and 19 simultaneously feed these convergence amplifiers $16_R$, $17_R$, $16_B$, $17_B$ by means of adders $20_R$, $21_R$, $20_B$, $21_B$ are respectively provided for each of these four amplifiers.

Like circuit 18, circuit 19 has two inputs $19_1$ and $19_2$ receiving signals at frequencies corresponding to line $f_h$ and frame $f_v$ scanning frequencies. Preceding the four outputs $19_3$ to $19_6$, driving the corresponding inputs of the adders $20_R$, $21_R$, $20_B$, $21_B$, the circuit 18 comprises digital-analog converters $22_R$, $23_R$, $22_B$, $23_B$.

The convergence adjustment circuit 19, whose purpose is to superimpose the red and blue images on the green image, is based on the division of the screen into 208 zones: 16 zones, numbered from 0 to 15 in FIG. 4, in the horizontal direction and 13 zones in the vertical direction including 12 zones and an initialization zone 24 (FIG. 4) corresponding to the frame suppression interval. In FIG. 4, rectangle 25, defined by a thick broken line, corresponds to the visible part of the image on the screen. The time in microseconds, as well as the zone numbers, are shown in the horizontal direction, and the number of scanning lines for the first half frame in the SECAM or PAL standard (626 lines per image) is shown in the vertical direction.

To each of the zones are assigned four correction values, that is to say four signals at the outputs $19_3$ to $19_6$.

Dividing into zones is provided by means of an address generator 26 receiving the signals at frequencies $f_h$ and $f_v$ and, for modifying the sequence of the address signals in the case of a change of standard, by means of a microprocessor 27, also forming part of circuit 19 and which has one input $27_1$ receiving signals from a remote control box (FIG. 14). The microprocessor also comes into play for calculating the correction signals.

These correction signals are stored in a RAM 28 of a capacity of 2K bytes with an input $28_1$ connected to the output of the address generator 26 and an input-output $28_2$ connected to an input-output $27_2$ of microprocessor 27. With this RAM 28 is associated a battery (not shown) for safeguarding its contents when the circuit is disconnected from its power supply.

The output $28_3$ of memory 28 is connected to the input of an interpolator 29 whose role is, as will be seen further on, to smooth the correction values from one vertical zone to another (in the same column). The output signals of this interpolator 29 are in series, like the signals of memory 28; they feed a demultiplexer 30 connected to the four outputs $19_3$ to $19_6$ by the digital-analog converters $22_R$, $22_B$, $23_R$, $23_B$.

The microprocessor 27 is used during the convergence adjustment phase for modifying the contents of memory 28 as a function of the orders issued by the user. This microprocessor 27 is also used for automatically transforming the correction values stored in memory 28 in response to a change of video standard, without the user having to make any adjustment, for example when passing from the SECAM standard to the NTSC standard. In other words, it is not necessary to make a new adjustment when changing video standards.

GEOMETRY CORRECTION CIRCUIT 18 (FIG. 3)

This circuit 18 generates signals—which cannot be modified by the user—for making the conventional corrections of geometric defects intrinsic in television scanning. This circuit 18 also generates signals adjustable by the user by means of the remote control box acting on the input $18_6$. These adjustment accessible to the user are those for compensating for non-perpendicularity to screen 9 of the three light beams projected by lenses $11_1$, $12_2$ and $13_1$. These adjustments affect first of all vertical amplitude, that is to say that they modify the height of the image. They also affect vertical linearity, that is to say that they allow the vertical direction distances to be re-established. Finally, the user may also make a "horizontal trapezoid" adjustment for modifying the length of the lines so as to re-establish the rectangular shape of the image.

The adjustments not accessible to the user also comprise vertical amplitude, vertical linearity and horizontal trapezium adjustments. Furthermore, horizontal linearity, horizontal amplitude, horizontal curvature, north-south pincushion and east-west pincushion corrections are provided.

For making fixed geometry corrections (those non-adjustable by the user), a reference voltage $V_{ref}$ is integrated with the line frequency $f_h$ and with the frame frequency $f_v$ so as to form signals proportional to x, to $x^2$, to y, to $y^2$, to xy and to $x^2y$, x and y being the coordinates, respectively horizontal and vertical, of the spot on the screen.

For the so-called "variable" geometry corrections (those accessible to the user), a control voltage $v_{cont}$, of a value adjustable by the user from the remote control box, is integrated with the frame frequency so as to form the signals proportional to y and $y^2$.

The signal $v_{ref}$ is applied to the input of a first integrator 31 reset at the line frequency $f_h$ and to the input of an integrator 32 reset at the frame frequency $f_v$. At the output of integrator 31 a signal x is obtained which is applied to the input of a second integrator 33 also controlled at the frequency $f_h$ and thus delivering at its output a signal $x^2$.

The output of integrator 31 is connected to the first input of a multiplier 34 whose second input receives the output signals from the integrator 32, i.e. the signal y. Thus, the output of multiplier 34 delivers a signal xy which is applied to an input $35_1$ of an adder 35 by means of a horizontal trapezoid adjustment potentiometer 36.

The output signal from integrator 31 is also applied to a second input $35_2$ of adder 35 by means of another potentiometer 37 for adjusting the horizontal amplitude. Adder 35 has a third input $35_3$ receiving the output signal $x^2$ from integrator 33 with a coefficient which depends on the adjustment of a horizontal linearity potentiometer 39. The output of adder 35 forms the horizontal correction output $18_1$ of generator 18.

The output signal $x^2$ from integrator 33 is also applied to the first input $41_1$ of another adder 41 through a potentiometer 42 for adjusting the horizontal curvature. The output of adder 41 forms the vertical correction output $18_2$ of generator 18.

The output xy of multiplier 34 is applied to the input of another integrator 43 controlled at the line frequency $f_h$ and thus delivering at its output a signal $x^2y$ which is applied, through a potentiometer 44, to the second input $41_2$ of adder 41. The signal at input $41_2$ affects the north-south pincushion correction.

The output of integrator 32 which delivers a signal y is fed to the third input $41_3$ of adder 41 through a potentiometer 45 for adjusting the vertical amplitude. The output signal from integrator 32 is also applied, through a potentiometer 46, to the first input $47_1$ of an adder 47 whose output forms the output $18_3$ of circuit 18 which is connected to an east-west modulator, i.e. to a circuit carrying out a multiplication by x. The signal applied to input $47_1$ effects a horizontal trapezoid correction.

The output signal y from integrator 32 is applied to the input of another integrator 48 controlled at the frame scan frequency $f_v$ and thus delivering at its output a signal $y^2$ which is applied, through a potentiometer 49, to the fourth input $41_4$ of adder 41. This signal at input $41_4$ contributes to the vertical linearity correction. The signal $y^2$ is also applied to the second input $47_2$ of adder 47 through another potentiometer 50 for effecting the east-west pincushion correction.

The control voltage $v_{cont}$ adjustable by the user by means of the remote control (key 130, FIG. 14) is applied to the input of an integrator 51 controlled at the vertical frequency $f_v$ and thus delivering at its output a signal proportional to y, namely $\alpha y$. This signal $\alpha y$ is transmitted to the fifth input $41_5$ of adder 41 through a resistor 52 (or several resistors) multiplying the output of integrator 51 by a coefficient $K_1$. The signal $K_1 \alpha y$ at input $41_5$ allows the vertical amplitude correction to be made.

The output signal $\alpha y$ from integrator 51 is applied, through one (or several) resistor(s) 53 multiplying the output of integrator 51 by a coefficient $K_3$ to the third input $47_3$ of adder 47. The signal at $47_3$ contributes to the horizontal trapezoid correction.

Finally, the signal $\alpha y$ is fed to the input of an integrator 54 controlled at the vertical scanning frequency $f_v$ and thus delivering at its output a signal $\alpha y^2$ which is transmitted to a sixth input $41_6$ of adder 41 through one (or more) resistor(s) 55 multiplying the output of integrator 54 by a coefficient $K_2$. The signal $K_2 \alpha y^2$ applied to input $41_6$ allows the vertical linearity correction to be effected.

It should be noted that the east-west modulator, which receives the output signals from adder 47 and forms part of the basic circuit of the video-projector, makes the greatest amplitude correction, which is particularly useful for the horizontal trapezoid correction (the most important correction to be effected.) Finally, the reference voltage of the vertical frequency integrators 32, 48, 51 and 54 is adjustable, under the control of the microprocessor 27, at the time of a change of video standards. It should also be noted, as will be seen further on, that the reference voltage of analog to digital converters $22_R$, $22_B$, $23_R$, $23_B$ is also adjustable and for the same reason.

CONVERGENCE ADJUSTMENT CIRCUIT 19

1. Address generator 26 (FIG. 5)

The signals of frequencies $f_h$ and $f_v$ appearing at inputs $19_1$ and $19_2$ are applied to a shaping circuit 60 transforming the substantially sinusoidal pulses into rectangular pulses.

This shaping is illustrated in the diagram of FIGS. 6a and 6b for the signal at the horizontal scan frequency: input $19_1$ receives the signal 61 appearing at each line between times 0 and 12 μsec, i.e. during the line scan return period. This pulse 61 varies substantially sinusoidally with an amplitude maximum at time t=6 μs. At output $61_1$, a signal referenced $f'_h$ is obtained also at the horizontal scan frequency but formed of rectangular pulses 62 (FIG. 6b).

The signal $f'_h$ is fed to a phase locked loop 63 comprising a voltage controlled oscillator or VCO 64 generating at its output $64_1$ a signal at the frequency of 1 MHz which is transmitted to a synchronous type divider 65 with quotient sixty-four (64). The synchronism of the signal from oscillator 64 with the input signal $f'_h$ is obtained through the connection of an output $65_5$ of divider 65 to the second input of a multiplier 66 whose first input receives the signal $f'_h$ and whose output is connected to the control input $64_2$ of oscillator 64.

The synchronous divider 65 has six outputs $65_0$ to $65_5$ at which appear signals, respectively $A_0$ to $A_5$, which are represented by the diagrams of FIGS. 6c to 6f. The signal $A_0$ is a periodic rectangular signal of duty cycle 0.5 at a frequency of 0.5 MHz (half of the frequency of the output signal of oscillator 64), signal $A_1$ has a frequency half that of signal $A_0$, the frequency of signal $A_2$ is half that of signal $A_1$, etc . . . Thus, the signal $A_5$ has the frequency of 15 625 Hz, i.e. the line scan frequency $f_h$.

The signals $A_0$ and $A_1$ are used, in each zone, for controlling the read-in (or read-out) sequence of the correction signals for the convergence amplifiers. Thus, when $A_0=0$, the correction signals are read-in (or read-out) for the auxiliary horizontal convergence deflectors; for $A_0=1$ it is the correction signals for the vertical deflectors which are read-in or read-out. If $A_1=0$, the red channel R is stored (or acted upon) and if $A_1=1$ it is the blue channel B which is concerned.

The four remaining signals, $A_2$ to $A_5$ form the bits of a binary number which represents the number of one of the sixteen horizontal columns or zones (FIG. 4).

The numbers of the vertical rows or zones are produced by means of a programmable divider 68 with outputs $68_6$ to $68_9$ at which appear four bits $A_6$ to $A_9$. The divider 68 is reset at the beginning of each frame through a control circuit 69 emitting a reset pulse applied to a RESET input $68_1$. This circuit 69 is, for this purpose, connected to the output $60_2$ of the shaping circuit 60 and so receives at an input $69_1$ a rectangular signal $f'_v$ at the vertical scan frequency.

Circuit 69 includes another input $69_2$ receiving a signal representative of the video standard, i.e. of the number of lines per frame. In fact, with the image divided into a constant number of rows (13) the number of lines per zone will vary with the standard. Thus, with the 625 line standard, each zone comprises 24 lines per half frame whereas with the 525 line standard each of these zones comprises 20 lines per half frame. Thus, the control circuit 69 has four parallel outputs $69_3$ to $69_6$ connected to corresponding inputs of divider 68 so that the division factor is such that each zone includes the corresponding number of lines per half frame.

Finally, circuit 69 has an output $69_7$ for controlling, as will be seen further on, the transfer of an initial value from memory 28 to an integrator forming part of the interpolator 29.

The purpose of this interpolator is to smooth the correction values from one vertical zone to another.

II. The smoothing between the contiguous zones in the *horizontal direction* takes place naturally because of the response times of the auxiliary coils and of the convergence amplifiers. The response of a convergence amplifier with the associated coil is shown in FIGS. 9a to 9b. FIG. 9a shows a signal v applied to the input of a convergence amplifier and FIG. 9b shows the signal $\Delta x$ obtained in the corresponding coil. The amplifier-coil assembly thus has a Bessel response with a rise time equal to the width (4 μs) of a zone in the horizontal direction.

III. Interpolator 29 (FIGS. 10 and 11)

The difficulty (compared to horizontal smoothing) of smoothing in the vertical direction is due to the fact that the zones concerned are not contiguous in time.

Before describing the interpolator 24 with reference to FIG. 10, the principle of such linear interpolation will be explained first of all with the diagrams of FIGS. 11a to 11f.

Linear interpolation is accomplished by assigning to each initial zone during frame return a constant value represented by the segment 70 in FIG. 11a and segment 71 in FIG. 11b. On the other hand, in the other zones of the same vertical column, the correction signals do not remain constant but vary linearly. This linear variation is shown by segments $71_1$, $71_2$ etc . . . in FIG. 11b. The rate of linear variation is in general different from one zone to another. In other words, to each zone is assigned a constant value which is the slope of segments $71_1$, $71_2$, i.e. the rate of variation of the correction signal in this zone. Thus, in FIG. 11a, the slope of the first visible zone of the image is shown by the segment $70_1$, the slope for the second zone is shown by the segment $70_2$ etc . . .

Of course, the contiguous segments of FIG. 11b are connected to each other, i.e. for each change of zone in the vertical direction there is no discontinuity but simply a change of slope. In a zone of number i the correction signal $V_{Si}$ (FIG. 11b) varies in the following way:

$$V_{Si} = V_{Si-1} + (1/t)V_{ei}(t-t_{i-1}) \quad (1)$$

In this formula: t represents the duration of a zone in the vertical direction, i.e. in the example the duration of 24 lines (in the 625 line standard) or 20 lines (525 line standard), $V_{Si-1}$ is the value reached by signal $-V_s$- at the last line of the preceding zone and $t_{i-1}$ is the time at the beginning of the zone.

It will be noted that segments 70, $70_1$ as well as segments 71, $71_1$, $71_2$ . . . of FIG. 11b shows signal envelopes and not signals for these latter only appear for 1/16th of the duration of each line (width of a column). In other words segments 70 and 71 are not, as shown, continuous segments but successions of segments parallel to the axis of the abscissa.

When it is desired to modify the correction signal in a visible image column, the slope in this zone is increased (or decreased), i.e. the signal $V_e$ for this zone is increased (or decreased) by an amount $\Delta V_e$. But so as not to affect the following zones, the signal of the immediately following vertical zone is decreased (or increased) by the same amount $\Delta V_e$ (FIG. 11c). Thus, as shown in FIG. 11d, the signal $V_s$ is only modified for the zone in question and the next zone. As a variant, for said modification, instead of the following zone, the preceding zone may be taken.

For a correction of the same value for all the zones of the same column (FIG. 11f), it is sufficient to shift the signal $V_e$ assigned to the initial zone (frame return) by the corresponding amounts so as to obtain the desired result (FIG. 11e).

It should be noted here that to each zone there correspond four correction values: horizontal red, vertically red, horizontal blue and vertical blue. In other words, for each column, four segments 70 are provided in the initial zone and for the visible zones four slope values are provided.

The interpolator providing the functions described with reference to FIG. 11 is shown in FIG. 10. It comprises a multiplexed digital integrator formed principally of a buffer memory 75 having a capacity of 64 twelve bit words and an adder 76 adding twelve-bit words.

The integration consists, for each line, in increasing the contents of memory 75 by the value of an increment which is a function of the value of signal $V_e$ in the zone in question (FIG. 11a). This increase is achieved by means of the adder 76. Referring to the formula (1) it can be seen that the increment has a value $V_{ei}/24$ for the 625 line standard and $V_{ei}/20$ for the NTSC standard.

The integrator receives its information from the memory 28 and control signals from the address generator 26.

In FIG. 10, conductor 77 is connected to the output of memory 28. It applies its digital 8-bit signals, on the one hand, to an input $76_1$ of adder 76 and, on the other, to the input $78_1$ of a latch circuit 78. The signals delivered by the address generator 26 are, on the one hand, a 1 MHz signal on a conductor 79 delivered to the input $80_1$ of a control circuit 80 and, on the other, a signal $V_I$ controlling the initial value at the end of the frame return (e.g. on line 22 in the PAL-SECAM system) delivered by a conductor 81 connected to the input $80_2$ of the control circuit 80 and, finally, address signal $A_0$ to $A_5$ representing the type of correction value ($A_0$-horizontal or vertical), the channel ($A_1$-red or blue), and the number of the column ($A_2$ to $A_5$) is delivered by a conductor 82 to an input $75_1$ of memory 75. The control circuit 80 delivers an R/W signal at input $75_2$ of memory 75 as well as latch signals at the respective inputs $78_2$ and $83_1$ of the latch circuits 78 and 83.

The buffer memory 75 has a data input-output 75 which is connected to the output $78_3$ of the latch circuit 78, to the second input $76_2$ of adder 76 and to the output $83_2$ of the second latch circuit 83 whose data input $83_3$ is connected to the output $76_3$ of adder 76.

This interpolator which has just been described with reference to FIG. 10 operates in multiplexed fashion and as described with reference to FIG. 11, namely:

At the end of the frame return (on line 22 when using the PAL or SECAM systems) the address generator delivers at the input $80_2$ of circuit 80 an initialization signal $V_I$ which is transmitted to input $78_2$ of the latch circuit 78 for allowing transmission to the buffer memory 75 of the 64 eight bit words supplied by memory 28 (FIG. 2) and corresponding to the signal $V_e$ (FIG. 11a) for the initial zone and that for all the sixteen columns, each of them comprising four correction values: horizontal red, vertical red, horizontal blue and vertical blue.

With the buffer memory 75 of twelve bit capacity, the eight bits of the words supplied by memory 28 are the most significant bits whereas the four least significant bits of each word of memory 75 are reset in this step.

The phase of loading memory 75 may last for one or several lines. After this phase, the integration proper begins: the first correction value $V_e$ (resulting in a visible signal), which corresponds for example to the horizontal red, for zone 0 is delivered at the input $76_2$ of adder 76 and is added to an eight-bit increment delivered to input $76_1$ by memory 28. The value of this increment is $V_0/24$ when each vertical zone comprises 24 lines (see the formula (1) above). Thus, at the output $76_3$ of adder 76 a signal $V_s$ is obtained which corresponds to the first point $71_1^1$ (FIG. 11b) of segment 71. The result of the addition, i.e. the above-mentioned signal $V_s$, which is a word of twelve bits, is fed to the memory 75 through the latch circuit 83 and this result replaces the initial value $V_0$ which was written into this memory 75. This signal $V_s$ at the output $83_2$ of the latch circuit 83 is also sent, over a conductor 84, to the demultiplexer 30 (FIG. 2).

The whole of these operations lasts 1 microsecond. Under the control of the variations of the signals conveyed by conductors 79 and 82, a new value is read into memory 75, e.g. the one which corresponds to the vertical red of the initial zone (frame return). Thus, the process which has just been described begins again: that is a repeat of the first integration step. With the duration of a line being 64 μs, the 64 correction signals are easily processed per line.

In the following line, the integration procedure continues, i.e. over segment $71_1$. After 24 frame lines, at the end of the first row, memory 28, under the control of the address generator, delivers a new value $V_e$ for each of the 64 correct signals. Thus segment $71_2$ is covered. The procedure continues until the end of the frame.

IV. Cursor and pattern generator (FIGS. 7, 8)

To facilitate the convergence adjustment, a cursor 85 (FIG. 8) is projected onto the screen in the form of a cross formed of two bright lines, one vertical $85_1$ and the other horizontal $85_2$ of the color (red or blue) to be adjusted and an identical cursor 86 of the green color, each of these cursors being in the zone to be adjusted.

For the user, the adjustment consists in operating the remote control for moving the cursor 85 so as to superimpose it on cursor 86.

In addition, in order to facilitate the adjustment, the zones of the image are projected on the screen by means of a pattern 87 formed of horizontal and vertical lines of the color (red or blue) to be adjusted and another pattern 88 identical to pattern 87, but for the color green. The brightness of the lines of patterns 87 and 88 is less than that of the lines of cursors 85 and 86.

To generate the cursors and the patterns, the circuit of FIG. 7 is used which comprises a shift register 90 with an input $90_1$ receiving from the microprocessor 27 the address of the zone in which the adjustment is to be carried out. This address is formed of a word of four bits for the horizontal coordinate and a word of four bits for the vertical coordinate. The microprocessor 27 also delivers the clock signal H applied to the corresponding input $90_2$ of register 90. The parallel outputs of register 90 are applied to the first inputs $91_1$ of a comparator 91 whose second inputs $91_2$ receive the word $A_2, A_3, \ldots A_9$ representing scanning of the zones of the screen as was explained above.

At the output $91_3$ of comparator 91 a signal is thus obtained only during the time of appearance of the zone concerned. This signal is applied to the input $92_1$ of a generator 92 of cursor 85 or 86. This generator 92 produces the horizontal $85_2$ and vertical $85_1$ segments. It has an enabling input $92_2$ receiving an enabling signal from the microprocessor 27 and two inputs $92_3$ and $92_4$ receiving the signals respectively $A_1$ and $A_6$ delivered by the address generator. It is the transitions of these signals $A_1$ and $A_6$ which are used for generating the cursor at the same time as the signal delivered by comparator 91.

Signals $A_1$ and $A_6$ are also used for generating the patterns 87 and 88 by means of a pattern generator 93 which comprises, in addition to two inputs $93_1$ and $93_2$ receiving these signals $A_1$ and $A_6$, an input $93_3$ for an enabling signal coming from the microprocessor 27.

The output of the cursor generator 92 is connected to the first input $94_1$ of an adder 94 whereas the output of the pattern generator 93 is connected to the second input $94_2$ of adder 94. However, this adder 94 is such that it assigns the coefficient ½ to the signal applied at its input $94_2$. Thus, the cursor 85 or 86 is brighter than the pattern 87 or 88.

The pattern 87,88 allows the zones of the image to be located. However, in the so-called "automatic" operating mode, as will be seen further on, this pattern is not projected onto the screen because a disabling signal is applied to the input $93_3$ of generator 93. In this case, the cursor moves automatically into the zone to be adjusted, its movement from one zone to another being provided in a sequence controlled by the microprocessor 27.

V. Demultiplexer 30 and digital-analog converters 22 and 23 (FIG. 12)

The output conductor 84 of interpolator 29 is connected to inputs of the latch circuit $96_R$, $96_B$, $97_R$ and $97_B$. The holding circuit $96_R$ stores the correction signals intended for the red color and for the vertical direction; circuit $96_B$ stores the signals for the blue color and the vertical direction; circuits $97_R$ and $97_B$ store the correction signals for the horizontal direction and, respectively, for the colors red and blue. This selective storing is provided by means of control signals, delivered by a control circuit (not shown) which, from signals $A_0$ and $A_1$, delivers clock signals $H_{RV}$, $H_{BV}$, $H_{RH}$, and $H_{BH}$ opening the latch circuits at the time when the corresponding correction signals appear on the conductor 84. In addition, these clock signals controlling the latch circuits 96 and 97 are used for delivering, at each line and for the corresponding zone, their contents during the duration of 4 μs of this zone. The circuits 96 and 97 thus place back in phase the correction signals applied in series at their input.

The D-A converters $23_R$ and $23_B$ which convert the correction signals for the vertical deflectors have a capacity of twelve bits for avoiding discontinuities in the vertical direction. On the other hand, discontinuities in the horizontal direction are less troublesome; this is why the digital-analog converters $22_R$ and $22_B$ are of the eight bit type.

Moreover, between each converter 23 and the corresponding auxiliary vertical convergence deflector there is inserted a sampling and holding circuit $99_R$, $99_B$ each of which has a sampling input to which is applied a control signal, respectively $S_{RV}$ and $S_{BV}$, supplied by said control circuit from the pulses $A_0$ and $A_1$. Such sampling and holding circuits overcome intermediate parasite states ("glitch") which may be present at the outputs of converters $23_R$ and $23_B$.

VI. RAM 28 and microprocessor 27 (FIG. 13)

The memory 28, of a capacity of 2K bytes, contains the correction signals which are applied to the auxiliary convergence deflectors during normal use of the videoprojector. This RAM 28 is loaded during the preliminary adjustment step, under the control of microprocessor 27. Thus, the address input $28_1$ of memory 28 is connected, on the one hand, to the address generator 26 through a gate 100 and, on the other hand, to the address output $27_3$ of the central unit 102 of the microprocessor 27 through another gate 101. These circuits 100 and 101 only let the information pass in a single direction towards the address input $28_1$ and are controlled so that one is disabled when the other is enabled. Circuit 100 transmits signals $A_0$ to $A_9$ (of ten bits) to the input $28_1$ of memory 28. The output $27_3$ of the microprocessor supplies, during the adjustment phase, ten-bit address signals to the memory 28.

The microprocessor 27 is formed of a central processing unit 102 and an EPROM memory 103 having a capacity of 4K bytes containing the programs or program data for the central unit. Memory 103 has an address input $103_1$ connected to the address output $27_3$ of the central unit 102. The address signals applied to input 103 comprise twelve bits. The data output $103_2$ of memory 103 is connected, on the one hand, to the data input-output $27_2$ of the microprocessor 27 and, on the other hand, by the same bus 105 or data conductor, in which a routing circuit 106 is provided, to the data input-output $28_2$ of memory 28.

The gate 106 is, depending on the order it receives, enabled in one direction or the other.

In FIG. 13 there has also been shown the input $27_1$ for the signals received from the remote control box and the input $27_4$ of the microprocessor to which is applied a signal representative of the video standard (in general 525 or 625 lines). There will also be noted an output $27_5$ connected to the enabling input $93_3$ of the pattern generator 93 (FIG. 7), an output $27_6$ connected to the input $90_1$ of register 90 which delivers the address of the cursors 85 or 86 and an output $27_7$ for controlling the routing circuits 100, 101, 106 as well as memories 28 and 103.

Change of standard

In normal use (after adjustment), in so-called "display mode", the microprocessor 27 is used for controlling the modification of the zones and of the correction signals when a signal at input $27_4$ indicates a modification of the standard. This signal applied to input $27_4$ of microprocessor 27 is delivered by a standard detection circuit (not shown) comprising, for example, a simple contact stud switch. The signal from the standard detection circuit is also fed to the input $69_2$ of circuit 69 controlling the address generator 26 (FIG. 5) so as to modify the division ratio of divider 68 as well as the counting sequence, more particularly the resetting (input $68_1$ of divider 68).

As we have already seen, each zone comprises twenty lines in the 525 standard and twenty-four lines in the 625 line standard. Because of the different number of lines in each zone it is clear that interpolation effected by integration as shown in FIG. 11 uses different parameters depending on the standard, i.e. the number of lines per frame.

In one embodient, all the correction signals are modified through a calculation, carried out by the microprocessor, which consists of replacing all the values corresponding to the segments $70_1$, $70_2$ etc . . . (FIG. 11a) by values varying in a way which is inversely proportional to the number of lines in each zone.

In another simpler embodiment the amplitude of the signals delivered by the D-A converters 22 and 23 is modified, for example by modifying their reference voltages, in an inverse ratio to the number of lines in each zone; instead of the reference voltages from converters 22 and 23, the gains of the convergence amplifiers 16 and 17 may be used. In this embodiment, the initial correction values represented by segments 70 and 71 (FIGS. 11a and 11b) are also modified. Thus, only a single value per column is modified.

By way of example, when the adjustment has been made in the 625 line standard and when it is then desired to use the video-projector for a 525 line standard, the reference voltages of converters 22,23 or the gains of amplifiers 16,17 are modified in the ratio $24/20=6/5$ and the initial values $V_0$ are multiplied by the inverse ratio, i.e. 5/6.

Since the calculation necessarily uses an approximation and since, coming back to another standard, for example coming back from 525 lines to 625 lines, the initial value would not necessarily be found again, it is necessary to keep stored in the memory the values of the correction signals obtained during the first adjustment operation. For this, a zone of the RAM 28 is used for keeping these values calculated during the adjustment, these values not being subsequently modified but being used as references at each change of standard.

Thus, the video-projector may be readily used with different standards.

If the adjustment was made in the 525 line standard, to come back to the 625 standard, the initial values $V_0$ are multiplied by 6/5 and the reference voltage of the digital-analog converters or the gains of the amplifiers are modified in a ratio of 5/6.

Remote control box 110 (FIG. 14)

For controlling the video-projector and making the adjustments, the user has a remote control box 110 (FIG. 14) which comprises the conventional keys 111 for stored channel numbers and 112 for adjusting the sound volume, the brightness, the color intensity, for station tuning and for the tuning frequency. This box further comprises an assembly 113 of keys for the geometry and convergence corrections, as well as a switch 114 which, depending on its position, allows the remote control box 110 to be used either in normal mode N for controlling the functions of the video-projector, i.e. for the use of keys 111 and 112, or in the adjustment mode indicated by the "convergence" positions in FIG. 14 with two positions corresponding to the two 525 and 625 line standards. Furthermore, a position RAZ is provided for resetting or for returning to an initial state the contents of memory 28.

In the example, the adjustment may be carried out in two modes: a first so-called "manual" mode in which the convergence adjustment is carried out zone by zone, the adjustment made in one zone not affecting the adjustment made in the other zones and a second "automatic" mode which brings into play the whole of the image at each adjustment. Actuation of a key 115 controls adjustment in manual mode. Actuation of a key 116 causes passage to the automatic mode.

In the manual adjustment mode the operation is as follows: the user places the switch 114 in a "convergence" position corresponding to the standard used, for example 625 lines per frame, then he presses key 115. On the screen there then appear at least one pattern 87 or 88 and at least one cursor 85 or 86. He then operates keys $119_1$ to $119_4$ for bringing the cursors 85 and 86 into the zone of the pattern for which he desires to effect the convergence adjustment. Actuation of key $119_1$ moves the cursors downwards in the vertical direction, key $119_2$ controls the movement of the cursors also in the vertical direction but upwards. Key $119_3$ is used for moving the cursors leftwards in the horizontal direction and key $119_4$ effects this horizontal movement towards the right.

Once the cursors are installed in the desired zone, the user presses a red key 117 or a blue key 118. In this position there appear on the screen the cursor of the selected color (red or blue) and the pattern 87 of the same color, as well as the green cursor 86 and the green pattern 88, and the effect of keys 119 is movement of the red (or blue) cursor 85 with respect to the green cursor 86. Each time a key 119 is actuated in this position, there is caused, under the control of the microprocessor, a modification of the correction values in memory 28 for the corresponding zone and for the chosen color red (or blue). For example, each time that any key 119 (such as $119_1$ through $119_4$) is actuated, which corresponds to a movement by one step of cursor 85 downwards in the vertical direction, the corresponding value is increased by an increment in memory 28 whereas each time that key $119_2$ is actuated the corresponding value in this memory 28 is decremented by the same amount. Once the adjustment has been made for one of the colors, the other key 118 or 117 is pressed for carrying out the same adjustment for the other color.

In this manual adjustment mode, the correction signals for the convergences in each one are generated independently of the correction signals for the other zones of the image. It will however be noted that, to ensure such independence, it is necessary to make a modification in a vertical direction in an adjacent zone, as was described with reference to FIGS. 11c and 11d.

This type of manual adjustment gives good results but it may be relatively long and tedious, particularly because of the large number of zones which the image comprises. This is why this adjustment may be used as a complement to an automatic type adjustment which allows corrections to be made over the whole of the image or over a group of image zones at each adjustment sequence.

In the automatic mode the microprocessor imposes a sequence of adjustments, that is to say that while in this operating mode the user cannot freely choose the zone in which the pair of cursors is located; in the first step, this pair is automatically placed in a given position, in the example in the center of the screen. When this first adjustment has been made for the two colors red and blue by superimposition of the red cursor, then of the blue cursor with the green cursor, pressing an advance key 120 situated under the key AUTO 116 automatically brings the cursor into a second position. The number of adjustment sequences is preferably less than the number of image zones. In the example, the number of positions of the cursor in which adjustments may be carried out is thirteen (13).

In the first step, corrections are made over the whole of the zones. From the second step corrections are made over the whole of the zones of a half of the image and then over quarters of the image.

In FIG. 15 are illustrated the positions in which the pair of cursors appear successively in image 125 when this automatic adjustment mode is used:

At point 1, in the center of the image, the movement of the red (or blue) cursor towards the green cursor causes a general movement of the red (or blue) image, i.e. this first adjustment step affects the position of the whole of the red (or blue) image.

Point 2 is in the center of the upper half image. The adjustments made at this point cause a correction of amplitude and of slope of this upper half image, i.e. they adjust the magnification and slant of the upper red and blue half images with respect to the corresponding green half image.

Point 3 is in the center of the lower half image. The adjustments are the same as for point 2 but for the lower half image.

Point 4 is in the center of the right-hand half image. The adjustment at this stage affects the amplitude and slant of this right-hand half image.

Point 5 is in the center of the left-hand half image. At this point the amplitude and slant adjustment is made for the left-hand half image.

Points 6 and 7 are in the middle of the respectively upper and lower edges. Adjustments made at these points correct the vertical linearity and the vertical curvature of the red and blue images for the respectively upper and lower half images.

Point 8 is in the middle of the right-hand vertical side and point 9 is in the middle of the left-hand vertical side. At these points the adjustments made correct, for the red and blue images, the horizontal linearity and the horizontal curvature for the respectively right-hand and left-hand half images.

Finally, points 10, 11, 12 and 13 are situated at the four corners of the image: top right, top left, bottom left and bottom right. For these positions of the cursor, the corrections made are horizontal and vertical trapezoid corrections for the corresponding quarters of the image.

To each adjustment step in the automatic mode there corresponds a table of corrections which is stored in the memory 103 of the microprocessor 27, the table being different from one step to another. The movement by a step of the red or blue cursor by actuating the keys 119 causes the transfer, whenever key $119_i$ is actuated, of an increment value to the corresponding positions of memory 28 so as to obtain the desired effect, for example the translation of the whole of the image during the first adjustment step. In other words, during the first adjustment step, actuation of keys 119 causes modification of the correction signals for all the zones of the image whereas in the manual mode this correction only involved a single zone of the image.

In each table the increments, which are added to or subtracted from the corresponding values in memory 28, are coded over eight bits, comprising a sign bit, three whole part bits and four fractional part bits (after the decimal point).

With the signals in the different memories being of digital type with a limited number of bits, the result of each increment or decrement at each position of memory 28 is, in the general case, a value approximated by excess or by insufficiency. The approximation which results therefrom is not troublesome for the addition or subtraction of a single increment; on the other hand, if no precaution is taken, the accumulation of such approximations when several increments are added or subtracted in succession may cause errors affecting the quality of the adjustment. To avoid such errors, during the step by step adjustment, the increment additions and subtractions are carried out in the following way:

The number N of times that each key $119_i$ is actuated is stored either in a counter (not shown) or in the memory 103 of the microprocessor or in memory 28. Counting is provided for each direction (horizontal or vertical) and for this direction the number N is increased by one for an action in one direction and decreased by one for an action in the other direction. For example, for the vertical direction, the number N increases when key $119_1$ is depressed and decreases when key $119_2$ is depressed.

The value which is fed into memory 28 for the corresponding direction is then calculated as follows when the value has been increased by one: from the value which was in memory 28 the increment is subtracted N times and to the rounded result is added $N+1$(or $N-1$) in the opposite direction) times the increment. Thus, the inaccuracy or rounding off error is limited to its minimum value so that the accumulation of inaccuracies is avoided.

For a better understanding of this aspect of the invention, a decimal type numerical example is given hereafter: let us consider the simplest case in which an increment corresponds to a translation step. The value of this increment is 2.45: but the memory 28 only stores whole values. Thus, a step in the memory is stored at value 2 and at the end of four steps, if the steps are cumulated successively, the value 8 is obtained in the memory whereas the theoretical value corresponds to $4\times 2.45$, i.e. 9.90, practically 10. Thus, an error of 2 units would be obtained in the memory, which is inadmissible in practice. On the other hand, with the adjustment described above, at the end of the first step 2 is effectively stored in the memory but at the second step there is stored $2-2.45=-0.45$ rounded off to 0 and to this value is added $2\times 2.45=4.90$, rounded off to 5. At the third step: $5-2\times 2.45=0.1$ rounded off to 0 and $3\times 2.45=7.35$ is added, i.e. 7; at the fourth step: $7-2\times 2.45=-0.35$ rounded off to 0 and $4\times 2.45=9.90$ is added, rounded off to 10, which is very close to the real value 9.90.

In other words, at each step, the rounding off error of the preceding step is corrected.

These calculations are made under the control of the microprocessor 27. This process of eliminating rounding off errors is also applicable to the manual mode adjustment.

To sum up the automatic mode adjustment it should be mentioned here that the microprocessor 27, at each stage of the adjutment, effects the following operations: it sends the address of the pair of cursors; it decodes the operating keys 119: horizontal or vertical direction, increase or decrease by a unit of the increment; it consults the adjustment table corresponding to the stage, i.e. to the number of the points in FIG. 15 and, for each zone, it makes the modification in memory 28 depending on the value of the increment. Finally, actuation of the "advance" key 120 causes automatic passage to the next adjustment point. It will be recalled here that, during this automatic mode adjustment, the patterns 87 and 88 are not projected on the screen.

It may happen that, because of the defective positioning of the tubes with respect to the screen or because of an operating blunder, the number of adjustment steps is so great that the capacity of the memory 75 of interpolator 29 (FIG. 10) is exceeded. In this case, the contents of this memory could return to the zero value and the adjustments made beforehand would be lost, the cursor coming back to an end position, which might be construed by the user as to defect of the convergence adjustment circuit. To overcome this disadvantage, the microprocessor 27 is programmed so as to calculate for each incrementation step the value which will be introduced into memory 75 and for preventing the incrementation when it would lead to overshooting the capacity of the memory 75. In other words, in this case the cursor would remain motionless, which is an indication of the user that he cannot continue the adjustment and that he must either effect it in the reverse direction or check the positioning of the tubes with respect to the screen.

The reset position RESET of switch 114 (FIG. 14) allows the contents in each zone of memory 28 to be reset or to be set to a given value. This possibility is particularly useful for beginning again all the adjustment operations from the starting point when such adjustments have been effected in manual mode in certain zones, which might give an irregular appearance to the image.

If, in automatic mode, a calculation was effected at each stage and at each step for all the zones which must be modified, the adjustment time could be considerable because of the multiplexed operation of interpolator 29. This time is further increased by the time for the calculation carried out by the microprocessor for checking if the capacity of memory 75 has been exceeded or not. This is why microprocessor 27 is programmed, in this automatic mode, for carrying out the adjustment in the following way.

As long as a key 119 is depressed, the adjustment, with modification of the values in memory 28, is only made for the zone corresponding to the cursor and the immediately adjacent zones, both in the vertical and horizontal directions, so that the cursor keeps its form on the screen; and the number of adjustment steps carried out is stored. When the user stops depressing for a given time, i.e. $\frac{1}{2}$ second, the correction to be made, which depends on the number of steps recorded, is extended to all the zones concerned by this stage of the adjustment, for example the whole of the zones when the adjustment is made at point 1 in FIG. 15.

Of course, if any key 119 is again actuated the operation begins again: correction solely in the zones corresponding to the cursor then correction over the whole of zones concerned after the key has not been actuated for said given time.

With this type of adjustment, checking whether the capacity of memory 75 of interpolator 29 has been exceeded or not is only carried out after actuation of key $119_i$ has been stopped for $\frac{1}{2}$ second and, if it is ascertained by calculation in the microprocessor that the capacity of memory 75 might be exceeded, there is only introduced into this memory a number of increments corresponding to the maximum which it can accept.

The adjustment circuit may be delivered to the user with a memory 28 without contents. It is also possible to introduce in the factory, in the different positions, (corresponding to the zones of the image) in this memory 28, values which correspond to mean adjustments, e.g. for a mean given slant of the plane of the three axes of the tubes with respect to the vertical plane of the screen and for mean slant angles of the red and blue tubes with respect to the central green tube. In this case it is advantageous, when switch 114 is placed in the position RESET (FIG. 14), not to clear the memory 28 but to come back to the pre-adjustment values.

It should also be noted that the convergence and geometry adjustment circuit of the invention may be used not only for adjustment by the user but also during manufacture for quality controls.

Usually, the DC supply voltages for the different electronic components are produced from the VHT power supply. Thus it is for the single reference voltage used for the D-A converters 22,23. It is important for this reference voltage to remain constant or to keep a value so as to always have the same effect on the electron beam. Now, when the power supplied by the VHT increases, the voltage for accelerating the electron beam decreases and the efficiency of the convergence deflectors becomes greater, which modifies the adjustment. To overcome this disadvantage, a regulation circuit is provided which reduces the reference voltage of the D-A converters when the VHT power increases.

To avoid an error in handling the remote control box 110 after the adjustments have been effected, a switch is provided which, when it is in a given position, inhibits the action of keys 113.

What is claimed is

1. A convergence adjustment device for a color video projector, said projector comprising first, second, and third monochrome video projection tubes for projecting respective first, second, and third images each of a given color onto a screen, said projected images being superimposed on said screen to form a composite image, said convergence adjustment device affecting scanning of said second and third tubes in order to converge said respective second and third images projected onto said screen with said first image projected onto said screen, said convergence adjustment device comprising:

a random-access memory for storing scanning correction values for each of a plurality of convergence zones into which said projected images are divided, said scanning correction values representing corrections to be made to scanning signals of said second and third tubes in order to converge said respective second and third projected images with said first projected image within the corresponding convergence zones;

correction means for retrieving said scanning correction values from said random-access memory in synchronism with the scanning of said second and third tubes and for correcting said scanning signals of said second and third tubes in accordance with said retrieved scanning correction values during a normal operation mode of said color video projector; and computing means for modifying said stored scanning correction values in response to adjustment commands issued by an operator during an adjustment mode of said color video projector, said operator issuing said adjustment commands during adjustment steps for either a succession of single convergence zones or a succession of groups of convergence zones while observing a composite convergence image on said screen formed by a superimposition of a first convergence image projected onto said screen by said first tube and either a second or third convergence image projected onto said screen by said second or said third tube, respectively;

said computing means including first means for imposing a given sequence of adjustment steps, each adjustment step of said sequence being for a different group of convergence zones;

wherein said computing means modifies scanning correction values stored in said random-access memory corresponding to all of the convergence zones during a first adjustment step of said sequence, and modifies scanning correction values stored in said random-access memory corresponding to either successively smaller numbers of convergence zones or successively different groups of convergence zones during succeeding adjustment steps of said sequence, and wherein the number of adjustment steps in said sequence is less than the number of said convergence zones.

2. A device as recited in claim 1 further comprising a cursor generator for causing said first tube to project a first cursor onto said screen and for causing an operator selected one of said second and third tubes to project a second cursor similar in form to said first cursor onto said screen during said adjustment mode; and second means for moving said second cursor under control of said operator so as to bring said second cursor into coincidence with said first cursor; wherein said computing means further includes third means for modifying certain of said scanning correction values stored in said random-access memory as a function of the movement of said second cursor.

3. A device as recited in claim 2 further comprising fourth means for causing said first tube and said operator-selected tube to simultaneously project, along with said first and second cursors, first and second substantially identical patterns formed of orthogonal lines corresponding to division of said projected images into said convergence zones onto said screen during said adjustment mode, said first and second patterns having colors corresponding to colors of said first and second cursors and having brightnesses which are reduced as compared to brightnesses of said first and second cursors.

4. A device as recited in claim 2 or 3 wherein said first means positions said first and second cursors near the center of said screen during a first one of said sequence of adjustment steps, and wherein said third means modifies scanning correction values stored in said random-access memory for said operator-selected tube for all of said convergence zones during said first adjustment step so as to effect a translation of said second cursor and said second pattern projected by said operator-selected tube, said translation being determined by operator-controlled movement of said second cursor into superposition with said first cursor.

5. A device as recited in claim 2 or 3 wherein said third means limits time consumed by modification of said scanning correction values by providing for immediate modification of scanning correction values only for the zone within which said cursors are positioned and directly adjacent zones, and modifying scanning correction values for other zones, if any, only after operator controlled movement of said second cursor has ceased.

6. A device as recited in claim 5 wherein said third means modifies said scanning correction values for said other zones only after operator controlled movement of said second cursor has ceased for a predetermined time.

7. A device as recited in claim 2 wherein said second means includes movement means for moving said second cursor in steps of a predetermined length, said predetermined length having a corresponding predetermined modification value employed by said third means in modifying said scanning correction values.

8. A device as recited in claim 7 wherein said third means includes modification means for subtracting, from a preexisting scanning correction value, a quantity determined as n times said predetermined modification value, wherein n is an integer corresponding to a number of adjustment steps of said predetermined length, said subtracting producing a difference, said modification means thereafter adding to said difference n+1 or n−1 times said predetermined modification value depending on a direction of movement of said second cursor.

9. A device as recited in claim 1 wherein said computing means further includes control means for selecting either an adjustment operation including said sequence of adjustment steps impose by said first means or an adjustment operation including said adjustment steps for said succession of single convergence zones.

10. A device as recited in claim 9 wherein said random-access memory includes first and second regions, said first region storing predetermined scanning correction values and said second region storing scanning correction values as modified by operator adjustment commands, if any, whereby at any time said predetermined scanning correction values can be retrieved.

11. A device as recited in claim 1 which further includes vertical smoothing means for smoothing said scanning correction values between zones adjacent each other in a vertical direction, said vertical smoothing means including a linear interpolator.

12. A device as recited in claim 11 in which scanning correction values for zones immediately following a frame return period of said color video projector are initial values of scanning correction signals produced by said correction means, and in which scanning correction values for zones displaced in a vertical direction from said zones immediately following said frame return period are rates of variation of said scanning correction signals.

13. A device as recited in claim 12 wherein said computing means further includes rate of variation adjustment means for modifiying said rates of variation by modifying a rate of variation for a selected zone and modifying a rate of variation for a vertically adjacent zone in an equal and opposite sense.

14. A device as recited in claim 12 wherein said computing means further includes initial value adjustment means for modifying said initial values.

15. A device as recited in claim 12 which further includes control means responsive to a video standard selection for modifying, at a time of a change in video standard selection, said initial values by the ratio of numbers of lines in previously and presently selected video standards, and for modifying, by the inverse of said ratio, said scanning correction signals.

16. A device as recited in claim 15 which further includes digital to analog converters coupled to receive said scanning correction signals produced by said correction means and amplifiers coupled to outputs of said digital to analog converters, and in which said control means modifies said scanning correction signals by altering the gains of said amplifiers by the inverse of said ratio.

17. A device as recited in claim 15 which further includes digital to analog converters coupled to receive said scanning correction signals produced by said correction means and amplifiers coupled to outputs of said digital to analog converters, and in which said control means modifies said scanning correction signals by altering reference voltages in said digital to analog converters by the inverse of said ratio.

18. A device as recited in claim 1 or 17 in which said three monochrome video projection tubes include scanning coils and which further includes auxiliary scanning coils for said second and third monochrome video projection tubes and means connecting outputs of said correction means to said auxiliary scanning coils.

19. A device as recited in claim 18 which further includes geometry correction means for generating geometry correction signals and wherein said first monochrome video projection tube further includes an auxiliary scanning coil and means for coupling said geometry correction signals to all said auxiliary scanning coils.

20. A device as recited in claim 19 wherein said geometry correction means includes means responsive to operator adjustment commands for generating geometry correction signals comprising vertical amplitude, vertical linearity and horizontal trapezoid correction signals.

21. A device as recited in claim 20 in which said means responsive to operator adjustment commands is responsive to a single common signal used for generating said vertical amplitude, vertical linearity and horizontal trapezoid correction signals.

22. A device as recited in claim 21 wherein said geometry correction means includes first and second integrator means, said first integrator means integrating a frame frequency signal of said color video projector beginning at an initial value set by said single common signal and generating said vertical amplitude and horizontal trapezoid correction signals, said second integrator means being driven by an output of said first integrator means for generating said vertical linearity correction signal.

23. A device as recited in claim 1 or 17 which further includes means for dividing said projected images into sixteen equal length zones in a horizontal direction and thirteen equal length zones in a vertical direction.

24. A device as recited in claim 1 or 17 which further includes an operator controlled remote control means coupled to said computing means over an infrared communication link for generating said operator adjustment commands in response to operator actuation of adjustment mode keys, said operator controlled remote control means further including normal operation mode keys.

25. A device as recited in claim 24 wherein said adjustment mode keys include four keys for control of cursor movement, each respectively resulting in cursor motion, horizontally left and right and vertically up and down.

26. A device as recited in claim 24 further including geometry correction means for generating geometry correction signals and means coupling said geometry correction signals to said monochrome video projection tubes and wherein said operator controlled remote control means includes a key dedicated for control of said geometry correction means.

27. A device as recited in claim 11 in which said linear interpolator includes an integrator formed principally of a memory device and an adder, and demultiplexing means, wherein said demultiplexing means enables said memory device and said adder to be employed in smoothing scanning correction values for said second and third tubes.

28. A device as recited in claim 27 wherein said computing means uses said memory device in modifying said scanning correction values, and wherein said computing means determines if the capacity of said memory device will be exceeded while modifying said scanning correction values and stops modifying said scanning correction values when it determines that the capacity of said memory device will be exceeded.

29. A device as recited in claim 1 or 11 which further includes amplifiers and scanning coils for said second and third tubes, means connecting outputs of said correction means as inputs to said amplifiers and connecting outputs of said amplifiers to said scanning coils, wherein said amplifiers and said scanning coils have a response which results in smoothing variations in scanning currents output by said amplifiers and carried in said scanning coils as said second and third tubes are scanned in a horizontal direction.

30. A device as recited in claim 1 or 11 which further includes means for dividing said projected images into said plurality of convergence zones, said means for dividing including:
an address generator synchronized with the scanning of said second and third tubes, said address generator including a 1 MHz pulse generator with an output connected to a frequency divider means with parallel outputs, said parallel outputs of said frequency divider means comprising two groups of outputs, a first group of outputs representing a horizontal zone address and a second group of outputs representing a vertical zone address.

31. A device as recited in claim 30 wherein said random-access memory stores four scanning correction values for each zone, said four scanning correction values consisting of one horizontal scanning correction value and one vertical scanning correction value for each of said second and third tubes, wherein said parallel outputs of said frequency divider means further comprise a third group of outputs consisting of two outputs having the two highest frequencies of said parallel outputs, and wherein said device further includes selection means responsive to said third group of outputs for selecting one of said four scanning correction values to be read in or read out from said random-access memory.

32. A device as recited in claim 31 wherein said frequency divider means comprises a first frequency divider which produces said first and third groups of outputs, a second frequency divider driven by an output of said first frequency divider which produces said second group of outputs, and a programming means for programming said second frequency divider so as to control a number of horizontal image scanning lines in each zone in proportion to a number of horizontal scanning lines in a selected video standard.

* * * * *